(12) United States Patent
Suzuki

(10) Patent No.: US 11,568,659 B2
(45) Date of Patent: Jan. 31, 2023

(54) CHARACTER RECOGNIZING APPARATUS AND NON-TRANSITORY COMPUTER READABLE MEDIUM

(71) Applicant: FUJIFILM BUSINESS INNOVATION CORP., Tokyo (JP)

(72) Inventor: Yusuke Suzuki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 537 days.

(21) Appl. No.: 16/557,208

(22) Filed: Aug. 30, 2019

(65) Prior Publication Data

US 2020/0311493 A1    Oct. 1, 2020

(30) Foreign Application Priority Data

Mar. 29, 2019    (JP) .............................. JP2019-068277

(51) Int. Cl.
| | |
|---|---|
| *G06V 30/196* | (2022.01) |
| *G06K 9/62* | (2022.01) |
| *G06V 10/22* | (2022.01) |
| *G06V 10/20* | (2022.01) |
| *G06V 30/10* | (2022.01) |

(52) U.S. Cl.
CPC ......... *G06V 30/1983* (2022.01); *G06K 9/626* (2013.01); *G06V 10/22* (2022.01); *G06V 10/255* (2022.01); *G06V 30/10* (2022.01)

(58) Field of Classification Search
CPC .. G06V 30/1983; G06V 10/22; G06V 10/255; G06V 30/10; G06V 30/1448; G06V 30/153; G06K 9/626
See application file for complete search history.

(56) References Cited

U.S. PATENT DOCUMENTS

2015/0356365 A1* 12/2015 Collet .................. G06V 30/246
                                                              382/177
2018/0349693 A1* 12/2018 Watanabe ............ G06V 30/416

FOREIGN PATENT DOCUMENTS

| JP | 2015-138458 A | 7/2015 | |
|---|---|---|---|
| WO | WO-2015136692 A1 * | 9/2015 | ............. G06F 17/24 |

* cited by examiner

*Primary Examiner* — Chan S Park
*Assistant Examiner* — Daniel C Chang
(74) *Attorney, Agent, or Firm* — Oliff PLC

(57) ABSTRACT

A character recognizing apparatus includes an acquiring unit, an identifying unit, and a character recognizing unit. The acquiring unit acquires a string image that is an image of a string generated in accordance with one of multiple string generation schemes. The identifying unit identifies a range specified for a result of character recognition in each of the multiple string generation schemes. The character recognizing unit performs first character recognition on the string image, and if a result of the first character recognition has a feature of a particular string generation scheme of the multiple string generation schemes, the character recognizing unit performs second character recognition on the string image within the range specified for a result of character recognition in the particular string generation scheme.

11 Claims, 11 Drawing Sheets

FIG. 6
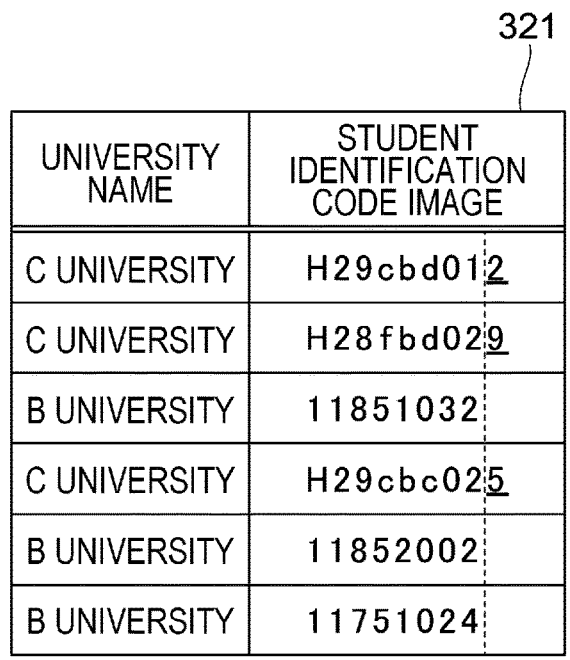
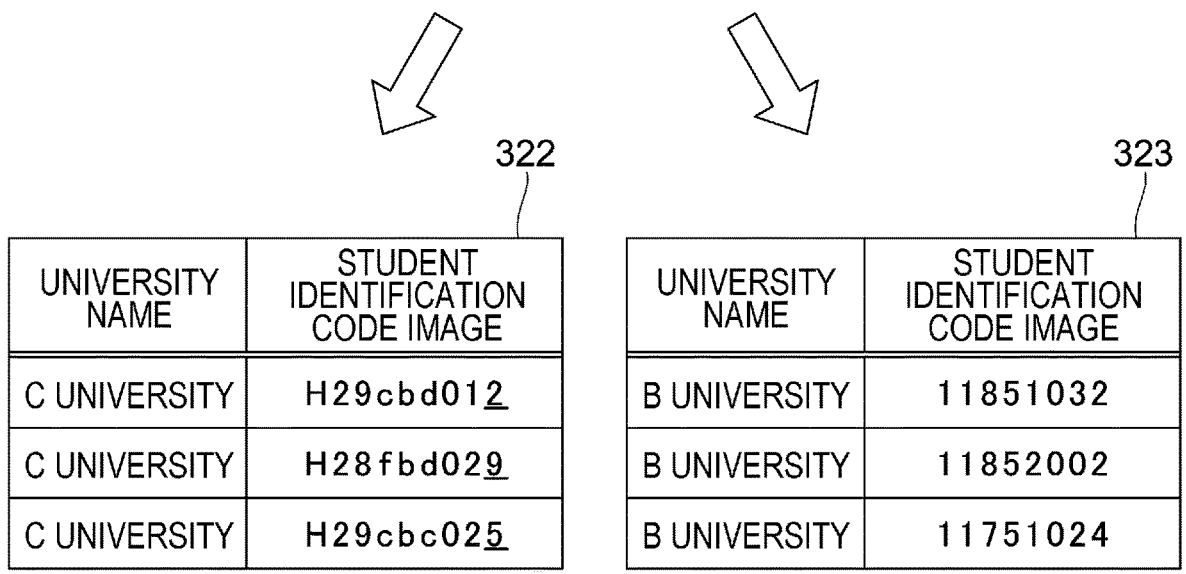

FIG. 7

| UNIVERSITY NAME | STUDENT IDENTIFICATION CODE IMAGE |
|---|---|
| A UNIVERSITY | 1EC18012 |
| A UNIVERSITY | 1EA18012 |
| B UNIVERSITY | 11851032 |
| A UNIVERSITY | 1EA18033 |
| B UNIVERSITY | 11852002 |
| B UNIVERSITY | 11751024 |

331

| UNIVERSITY NAME | STUDENT IDENTIFICATION CODE IMAGE |
|---|---|
| A UNIVERSITY | 1EC18012 |
| A UNIVERSITY | 1EA18012 |
| A UNIVERSITY | 1EA18033 |

332

| UNIVERSITY NAME | STUDENT IDENTIFICATION CODE IMAGE |
|---|---|
| B UNIVERSITY | 11851032 |
| B UNIVERSITY | 11852002 |
| B UNIVERSITY | 11751024 |

333

FIG. 8
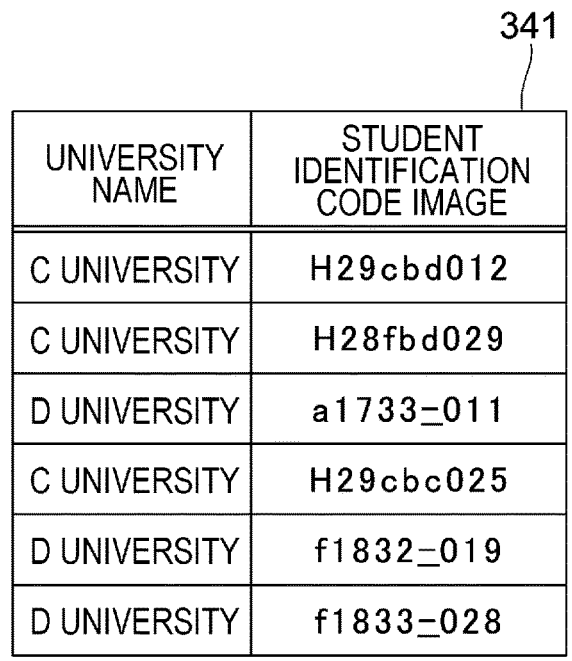
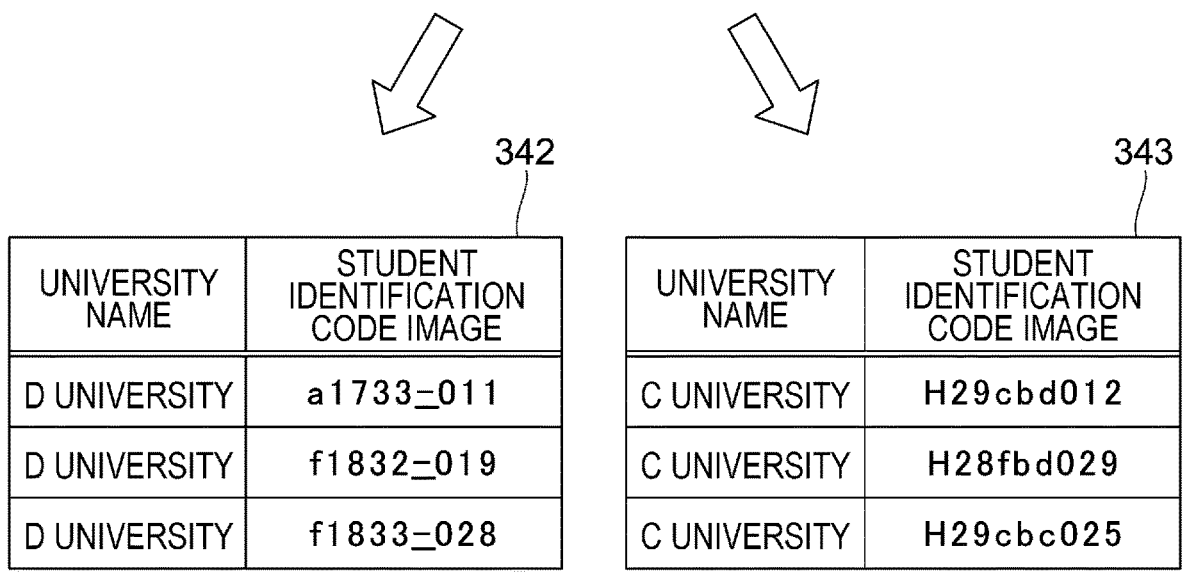

FIG. 10

| UNIVERSITY NAME | FIRST CHARACTER | SECOND CHARACTER | THIRD CHARACTER | FOURTH CHARACTER | FIFTH CHARACTER | SIXTH CHARACTER | SEVENTH CHARACTER | EIGHTH CHARACTER | NINTH CHARACTER |
|---|---|---|---|---|---|---|---|---|---|
| A UNIVERSITY | STUDENT TYPE | DEPARTMENT TYPE | | ACADEMIC YEAR OF ENROLLMENT | | PERSONAL IDENTIFICATION NUMBER | | | |
| | 0-9 | A-Z | A-Z | 1 | 6-8 | 0-9 | 0-9 | 0-9 | |
| B UNIVERSITY | STUDENT TYPE | ACADEMIC YEAR OF ENROLLMENT | | DEPARTMENT TYPE | | PERSONAL IDENTIFICATION NUMBER | | | |
| | 0-9 | 1 | 6-8 | 0-9 | 0-9 | 0-9 | 0-9 | 0-9 | |
| C UNIVERSITY | ACADEMIC YEAR OF ENROLLMENT | | | STUDENT TYPE | DEPARTMENT TYPE | | PERSONAL IDENTIFICATION NUMBER | | |
| | H | 2-3 | 0,8-9 | a-z | a-z | a-z | 0-9 | 0-9 | 0-9 |
| D UNIVERSITY | STUDENT TYPE | ACADEMIC YEAR OF ENROLLMENT | | DEPARTMENT TYPE | | SPECIAL CHARACTER | PERSONAL IDENTIFICATION NUMBER | | |
| | a-z | 1 | 6-8 | 0-9 | 0-9 | - | 0-9 | 0-9 | 0-9 |

CHARACTER RECOGNIZING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-068277 filed Mar. 29, 2019.

BACKGROUND

(i) Technical Field

The present disclosure relates to a character recognizing apparatus and a non-transitory computer readable medium.

(ii) Related Art

A known information processing system includes an acquiring unit, a recognizing unit, a determining unit, and an information processing unit. The acquiring unit acquires image data obtained by scanning characters that are entered into an input medium and that include information for identifying a data enterer, that is, data-enterer-identifying information. The recognizing unit obtains the characters in the acquired image data by using character recognition. The determining unit determines whether the data-enterer-identifying information expressed by the characters obtained by the character recognition includes incorrect data. If the data-enterer-identifying information obtained by the character recognition does not include incorrect data, the information processing unit registers the characters obtained by the character recognition in a recognized result list. In contrast, if the data-enterer-identifying information obtained by the character recognition includes incorrect data, the information processing unit modifies the characters obtained by the character recognition and registers the modified characters in the recognized result list. The characters are modified in accordance with a piece of data-enterer information that is included in a data-enterer list and that is expressed by using characters similar to the characters obtained from the acquired image data. In the data-enterer list, information for identifying a plurality of data enterers is registered in advance, and the information for identifying a plurality of data enterers includes information for identifying a plurality of data enterers who enter data into input media. The determining unit determines whether the data-enterer-identifying information obtained by the character recognition is included within a range specified in advance, and if the data-enterer-identifying information is not included within the range, the determining unit determines that the data-enterer-identifying information includes incorrect data (for example, refer to Japanese Unexamined Patent Application Publication No. 2015-138458).

SUMMARY

In an existing character recognizing technique, a string generation scheme for string images is formulated in advance, and character recognition of a string image is performed within a range specified in the formulated string generation scheme. On the other hand, it is sometimes necessary to perform character recognition on a string image that is an image of a string generated in accordance with one of a plurality of string generation schemes. In such a case, although it is possible to specify in advance a range formed by joining ranges each of which is specified in one of the plurality of string generation schemes, the range formed in this way has a wide coverage, which hinders accurate character recognition.

Aspects of non-limiting embodiments of the present disclosure relate to providing a configuration that provides character recognition having a higher accuracy than the character recognition provided by a configuration that specifies in advance a range formed by joining ranges each of which is specified in one of the plurality of string generation schemes.

Aspects of certain non-limiting embodiment of the present disclosure overcome the above disadvantages and/or other disadvantages not described above. However, aspects of the non-limiting embodiment are not required to overcome the disadvantages described above, and aspects of the non-limiting embodiment of the present disclosure may not overcome any of the disadvantages described above.

According to an aspect of the present disclosure, there is provided a character recognizing apparatus including an acquiring unit that acquires a string image that is an image of a string generated in accordance with one of a plurality of string generation schemes, an identifying unit that identifies a range specified for a result of character recognition in each of the plurality of string generation schemes, and a character recognizing unit that performs first character recognition on the string image and if a result of the first character recognition has a feature of a particular string generation scheme of the plurality of string generation schemes, performs second character recognition on the string image within the range specified for a result of character recognition in the particular string generation scheme.

BRIEF DESCRIPTION OF THE DRAWINGS

An exemplary embodiment of the present disclosure will be described in detail based on the following figures, wherein:

FIG. 6 is a schematic illustration depicting a second example of the teaching support apparatus according to the exemplary embodiment of the present disclosure;

FIG. 7 is a schematic illustration depicting a third example of the teaching support apparatus according to the exemplary embodiment of the present disclosure;

FIG. 8 is a schematic illustration depicting a fourth example of the teaching support apparatus according to the exemplary embodiment of the present disclosure;

FIG. 10 is an illustration depicting a specific example of specifying information stored in the teaching support apparatus according to the exemplary embodiment of the present disclosure.

DETAILED DESCRIPTION

Figure 1:
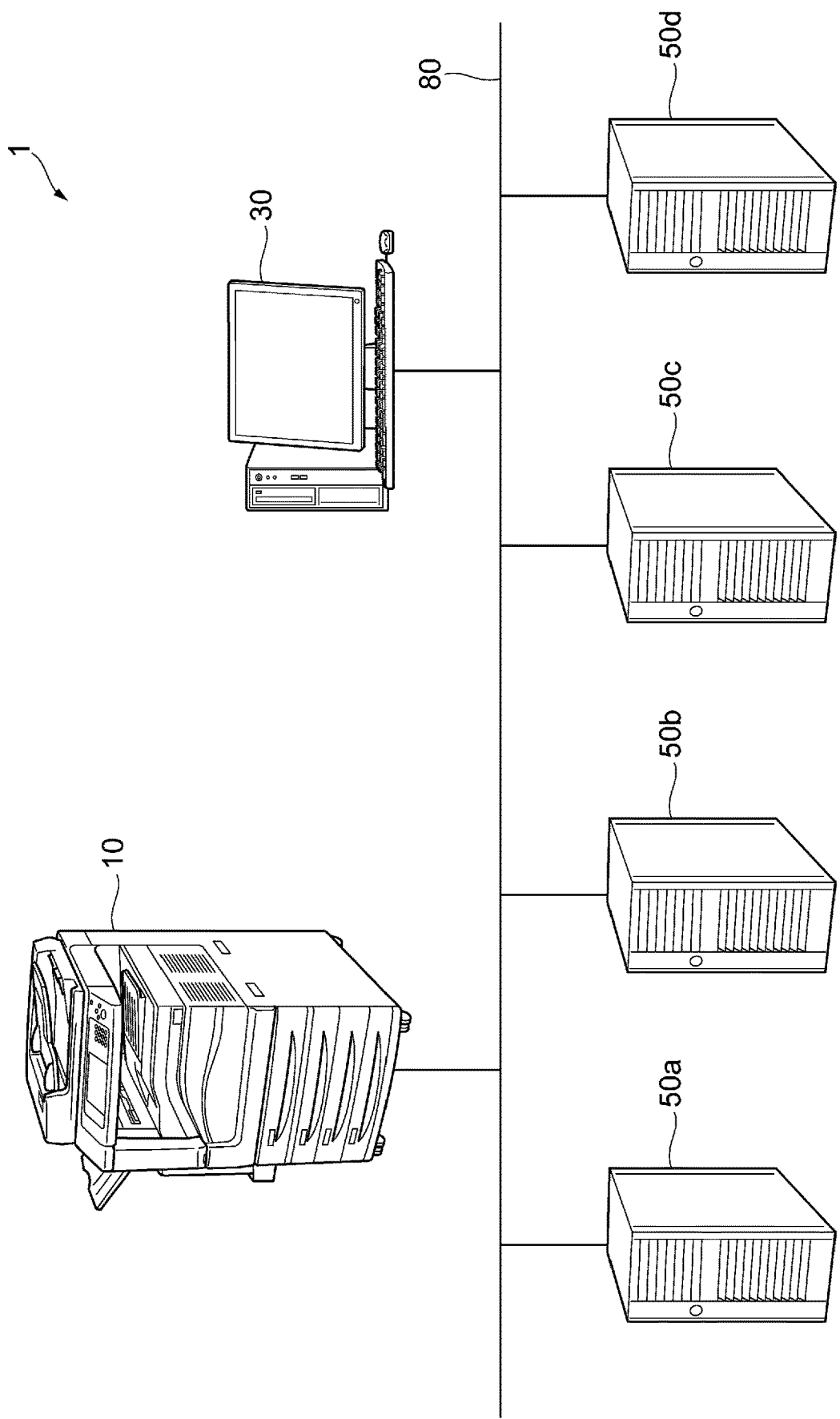
FIG. 1 is an illustration depicting an example of an overall configuration of a teaching support system according to an exemplary embodiment of the present disclosure.

Hereinafter, an exemplary embodiment of the present disclosure will be described in detail with reference to the attached drawings.

Background and Outline of Present Exemplary Embodiment

In an existing character recognizing technique, a range is specified in advance in accordance with a string generation scheme for string images, and character recognition of a string image is performed within the specified range. A string generation scheme mentioned here indicates rules under which strings are generated. Examples of such rules include, but are not limited to, the number of characters in a string and what kind of character is to be placed at a particular position in a string.

On the other hand, it is sometimes necessary to perform character recognition on a string image that is an image of a string generated in accordance with one of a plurality of string generation schemes. In such a case, it is possible to use a method to specify in advance a range formed by joining ranges each of which is specified in one of the plurality of string generation schemes. A range specified in a string generation scheme is a range from which candidate characters that can be used as characters forming a string are selected, and the range is specified for each character forming a string. A range formed by joining ranges each of which is specified in one of the plurality of string generation schemes indicates the union of ranges each of which is specified in one of the plurality of string generation schemes. For example, for the first character in a string, if the range specified in the first string generation scheme includes numerals from "6" to "8" and the range specified in the second string generation scheme includes numerals "0", "8", and "9", the range formed by joining the range specified in the first string generation scheme and the range specified in the second string generation scheme includes numerals "0" and from "6" to "9". If the range specified in the first string generation scheme includes numerals from "0" to "9" and the range specified in the second string generation scheme includes letters "a" to "z", the range formed by joining the range specified in the first string generation scheme and the range specified in the second string generation scheme includes numerals "0" to "9" and letters "a" to "z".

However, such a method to specify a range formed by joining ranges each of which is specified in one of the plurality of string generation schemes allows the formed range to have a wide coverage, which hinders accurate character recognition.

Thus, in the present exemplary embodiment, the first character recognition is performed on a string image, which is an image of a string generated in accordance with one of a plurality of string generation schemes, and if the result of the first character recognition has a feature of a particular string generation scheme, the second character recognition is performed on the string image within the range specified for a result of character recognition in the particular string generation scheme. Namely, the range specified for a result of character recognition means the range specified in the particular string generation scheme.

In addition, in the present exemplary embodiment, a feature of a string generation scheme and the range specified for a result of character recognition in the string generation scheme are associated with an attribute of an object represented by a string generated in accordance with the string generation scheme. Then, if the result of the first character recognition has a feature of a particular string generation scheme, it is desirable to identify an attribute with which the feature is associated and to identify the range of a result of character recognition, the range being associated with the attribute, as the range specified for a result of character recognition in the particular string generation scheme. In such a case, any attribute is allowed as long as the attribute is a property of an object represented by a string generated in accordance with a string generation scheme. A category that includes an object represented by a string generated in accordance with a string generation scheme is an example of such an attribute.

Further, in the present exemplary embodiment, a feature of a particular string generation scheme is desirably at least one of the rules concerning a string generated in accordance with the particular string generation scheme. In such a case, examples of the at least one of the rules concerning a string include, but are not limited to, a first rule in which a character at a predetermined position in a string needs to be one of predetermined characters, a second rule in which a string includes a predetermined number of characters, and a third rule in which a string includes at least one of predetermined characters or a string includes none of the predetermined characters.

A case in which the present exemplary embodiment is applied to character recognition of student identification codes will be described below. Specifically, in the following description, a "student identification code scheme" is taken as an example of a string generation scheme, a "student identification code" is taken as an example of a string generated in accordance with the string generation scheme, a "student" is taken as an example of an object represented by a string, and a "university" is taken as an example of a category in which an object is included.

Overall Configuration of Teaching Support System

FIG. 1 is an illustration depicting an example of an overall configuration of a teaching support system 1 to which the present exemplary embodiment is applied. As depicted in FIG. 1, an image reading apparatus 10, a teaching support apparatus 30, and teaching management servers 50a to 50d are connected to a communication network 80 and constitute the teaching support system 1. In FIG. 1, the teaching management servers 50a to 50d are depicted, but the servers are sometimes referred to as teaching management servers 50 when each of the teaching management servers need not individually be referred to. In addition, only four teaching management servers are depicted in FIG. 1, but two, three, or five or more teaching management servers 50 may be included.

The image reading apparatus 10 is an apparatus that reads images on a recording medium such as a sheet of paper. In addition to this function, the image reading apparatus 10 may be an apparatus that forms an image on a recording medium such as a sheet of paper and that transmits and receives an image and the like via a public communication network. The image reading apparatus 10 is considered to be a scanner in view of only reading images, a printer in view of only printing images, a copier in view of reading and printing images, or a facsimile in view of reading and transmitting images or receiving and printing images. In the present exemplary embodiment, the image reading apparatus 10 reads, in particular, answer sheets for a test performed for university students.

The teaching support apparatus 30 is a computing apparatus that supports teaching at universities by using read images obtained by scanning by using the image reading apparatus 10. In the present exemplary embodiment, the teaching support apparatus 30 performs as support for teaching at a university, in particular, processing in which characters contained in read images obtained by scanning answer sheets are recognized and the information based on the character recognition and the read images are returned to the university. In the present exemplary embodiment, the teaching support apparatus 30 is disposed as an example of a character recognizing apparatus.

The teaching management servers 50 are server computers that manage teaching at universities. In the present exemplary embodiment, the teaching management servers 50 accept and process the read images and the information based on the character recognition, both of which are returned from the teaching support apparatus 30. The teaching management server 50*a* is assumed to be disposed at A university, the teaching management server 50*b* is assumed to be disposed at B university, the teaching management server 50*c* is assumed to be disposed at C university, and the teaching management server 50*d* is assumed to be disposed at D university.

The communication network 80 is a communication unit used for information communication between the image reading apparatus 10 and the teaching support apparatus 30 and between the teaching support apparatus 30 and the teaching management servers 50. Examples of the communication network 80 include a local area network (LAN) and the Internet.

Hardware Configuration of Image Reading Apparatus

Figure 2:
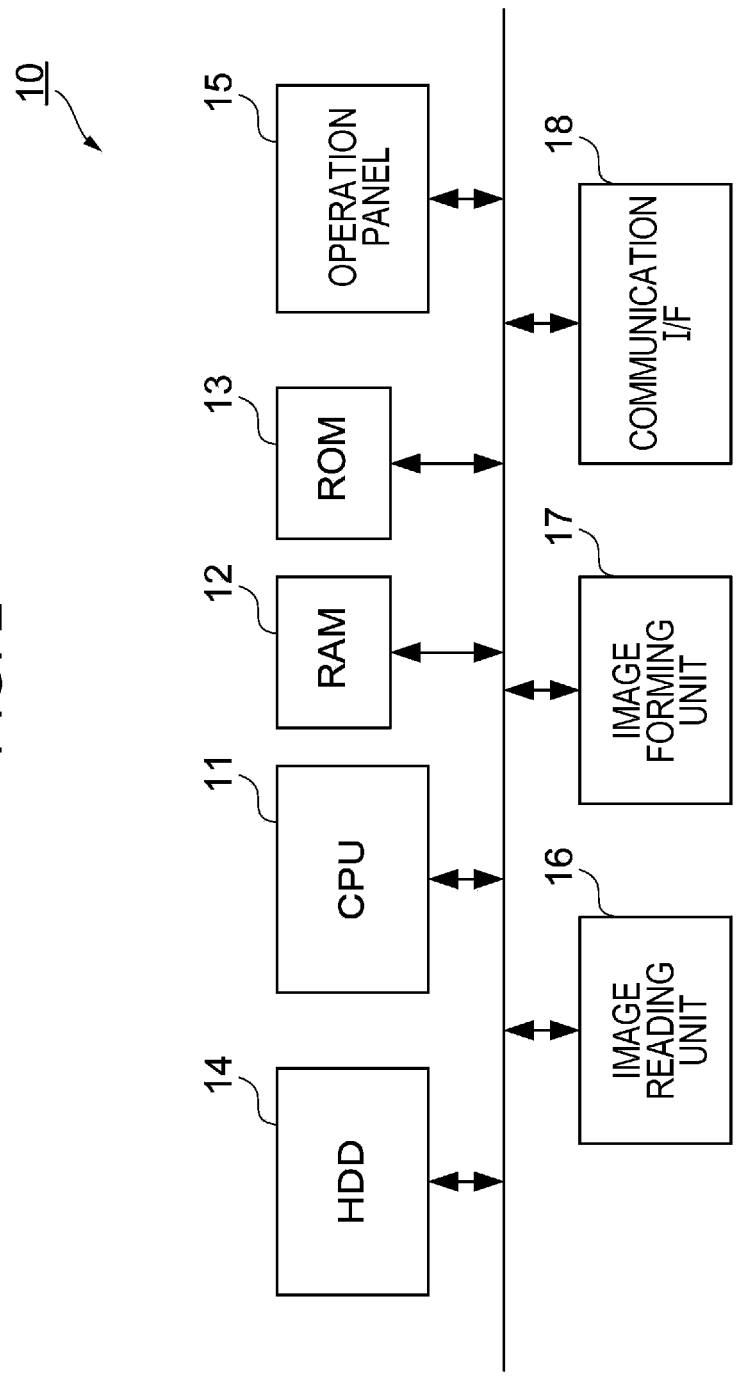
FIG. 2 is a diagram depicting an example of a hardware configuration of an image reading apparatus according to the exemplary embodiment of the present disclosure.

FIG. 2 is a diagram depicting an example of a hardware configuration of the image reading apparatus 10 according to the present exemplary embodiment. As depicted in FIG. 2, the image reading apparatus 10 includes a central processing unit (CPU) 11, a random access memory (RAM) 12, a read-only memory (ROM) 13, a hard disk drive (HDD) 14, an operation panel 15, an image reading unit 16, an image forming unit 17, and a communication interface (hereinafter, referred to as a communication I/F) 18.

The CPU 11 loads various programs stored in the ROM 13 and the like into the RAM 12 and executes the programs to realize various functions described below.

The RAM 12 is a memory used as a working memory and the like for the CPU 11. The ROM 13 is a memory that stores various programs and the like to be performed by the CPU 11. The HDD 14 is, for example, a magnetic disk apparatus that stores image data including image data obtained by scanning by the image reading unit 16 and image data to be used for image forming by the image forming unit 17.

The operation panel 15 is, for example, a touch panel that displays various kinds of information and that accepts operation inputs from a user. The operation panel 15 includes a display on which various kinds of information is displayed and a position detection sheet that detects a position to which an indicating unit, such as a finger or a stylus pen, points. Alternatively, a display and a keyboard may be used instead of a touch panel.

The image reading unit 16 scans an image recorded on a recording medium such as a sheet of paper. The image reading unit 16 is, for example, a scanner, and a scanner of a charge coupled device (CCD) type or a contact image sensor (CIS) type is desirably used. A scanner of a CCD type uses a lens to reduce an optical image formed by light reflected by a document irradiated by a light source and uses CCDs to receive the reflected light. A scanner of a CIS type uses a CIS to receive light reflected by a document irradiated sequentially by a light emitting diode (LED) source.

The image forming unit 17 forms an image on a recording medium such as a sheet of paper. The image forming unit 17 is, for example, a printer, and a printer of an electrophotographic type or an inkjet type is desirably used. A printer of an electrophotographic type transfers toner attached to a photosensitive member to a recording medium and forms an image. A printer of an inkjet type discharges ink on a recording medium and forms an image.

The communication I/F 18 transmits and receives various kinds of information to and from other apparatuses, such as the teaching support apparatus 30, via the communication network 80.

Figure 3:
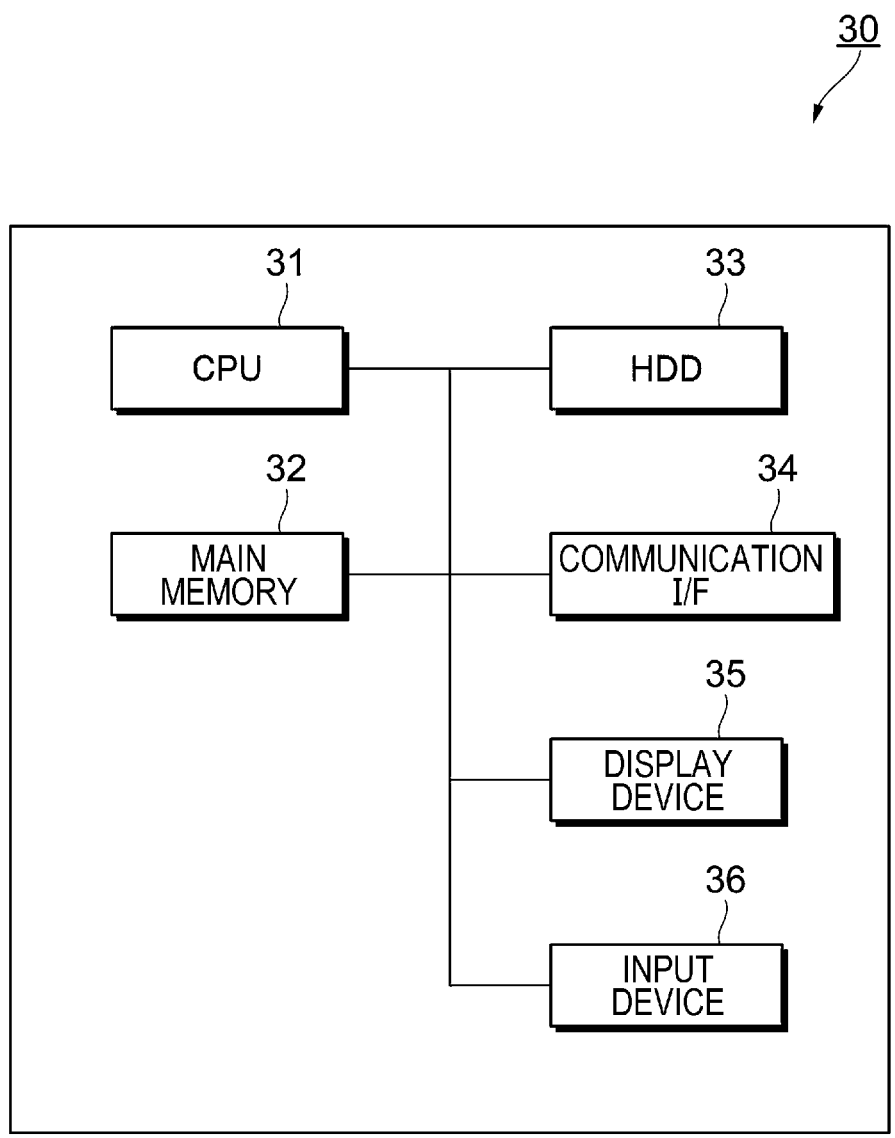
FIG. 3 is a diagram depicting an example of a hardware configuration of a teaching support apparatus according to the exemplary embodiment of the present disclosure.

Hardware Configuration of Teaching Support Apparatus and Teaching Management Server FIG. 3 is a diagram depicting an example of a hardware configuration of the teaching support apparatus 30 according to the present exemplary embodiment. As depicted in FIG. 3, the teaching support apparatus 30 includes a CPU 31, which is a calculating unit, and a main memory 32 and an HDD 33, which are storage units. The CPU 31 executes various kinds of software such as the operating system (OS) and applications and realizes various functions described below. The main memory 32 is a storage region for storing various kinds of software, data to be used for execution of the various kinds of software, and the like. The HDD 33 is a storage region for storing data that is input to the various kinds of software, data that is output from the various kinds of software, and the like. Further, the teaching support apparatus 30 includes a communication I/F 34 for communicating with external apparatuses, a display device 35 such as a display, and an input device 36 including a keyboard and a mouse.

The hardware configuration depicted in FIG. 3 can also be considered to be a hardware configuration of each of the teaching management servers 50. When one of the teaching management servers 50 is described, the CPU 31, the main memory 32, the HDD 33, the communication I/F 34, the display device 35, and the input device 36 in FIG. 3 are denoted by a CPU 51, a main memory 52, an HDD 53, a communication I/F 54, a display device 55, and an input device 56, respectively.

Background and Outline of Teaching Support System

In recent years, lectures in the form of a joint seminar in which students from a plurality of universities participate have been held. Since a plurality of universities have different student identification code schemes, when character recognition is performed on student identification codes entered on answer sheets used in such lectures, it is possible to specify in advance a range formed by joining ranges each of which is specified in one of the plurality of student identification code schemes. However, specifying a range formed by joining ranges each of which is specified in one of the plurality of student identification code schemes involves enormous load. In addition, if a range formed by joining ranges each of which is specified in one of the plurality of student identification code schemes is specified, the range formed in this way has a wide coverage, which hinders accurate character recognition. This consideration leads to the conclusion that it is more efficient to manually sort answer sheets into groups by university and to perform character recognition for each group corresponding to a university in accordance with the student identification code scheme of the university.

Thus, in the present exemplary embodiment, the first character recognition is performed on an image of a student identification code generated in accordance with one of a plurality of student identification code schemes, and if the result of the first character recognition has a feature of a particular student identification code scheme, the second character recognition is performed on the image of a student identification code within the range specified for a result of character recognition in the particular student identification code scheme.

An outline of the teaching support system 1 will be described below on the assumption that students that each belong to one of a plurality of universities having different student identification code schemes participate in a single lecture.

Figure 4:
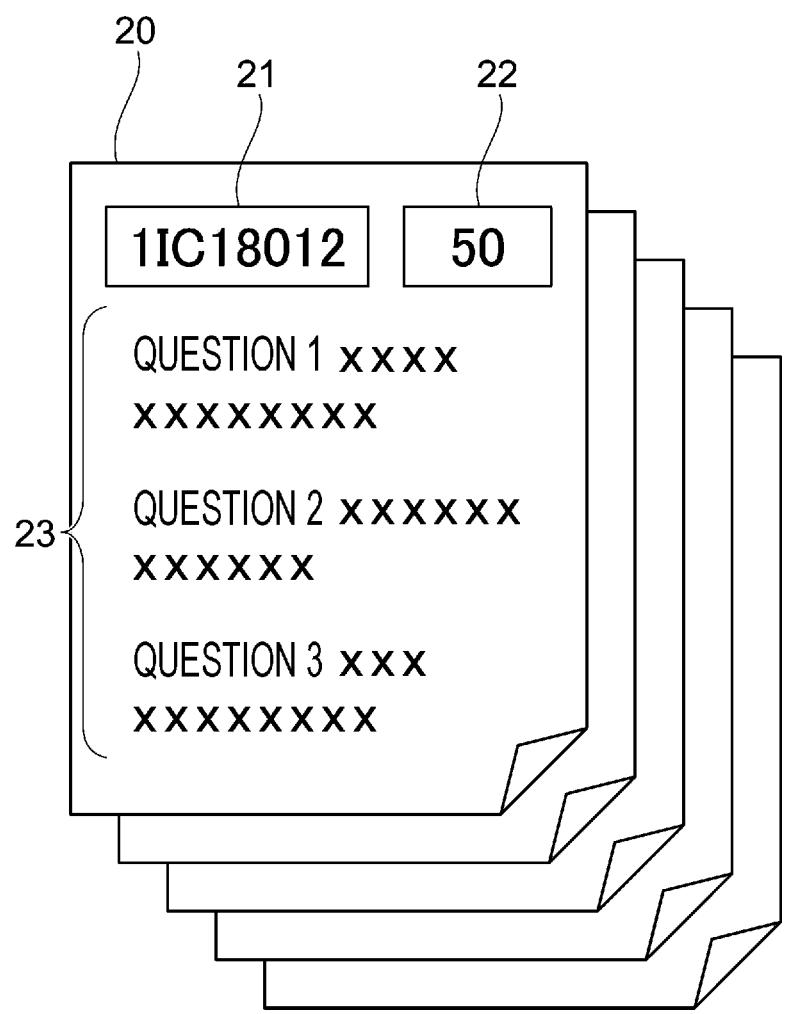
FIG. 4 is an illustration depicting example answer sheets used in the teaching support system according to the exemplary embodiment of the present disclosure.

FIG. 4 is an illustration depicting an example of answer sheets 20 used in a test for such a lecture. As depicted in FIG. 4, each of the answer sheets 20 has a student identification code box 21 in which a student identification code is to be entered by handwriting, a test score box 22 in which a test score is to be entered by handwriting, and a question and answer region 23 in which questions and answer boxes are included. When the answer sheets 20 are distributed, each of the students participating in this lecture from a plurality of universities enters by handwriting in the student identification code box 21 a student identification code of the university to which the student belongs and enters by handwriting answers to questions in the answer boxes in the question and answer region 23.

Next, for example, a lecturer collects the answer sheets 20 from the students participating in this lecture from the plurality of universities, takes the answer sheets 20 back, and grades the answer sheets 20 in accordance with the answers entered by handwriting in the answer boxes in the question and answer region 23. Then, a test score, which is the result of grading, is entered by handwriting in the test score box 22.

After entering the test scores, for example, the lecturer scans by using the image reading apparatus 10 the answer sheets 20 that have been graded. Then, the image reading apparatus 10 forwards read images to the teaching support apparatus 30.

Subsequently, the teaching support apparatus 30 acquires an image of a student identification code (hereinafter, referred to as a "student identification code image") from each of the student identification code boxes 21 and performs character recognition on a portion of the student identification code image. Next, the student identification code images are sorted into groups, each of which corresponds to a university, according to the matching degree between the result of the character recognition and a feature of the student identification code scheme of the university. Then, for each group, character recognition is performed on the student identification code images in accordance with the range specified in advance for the university. The teaching support apparatus 30 acquires an image of a test score (hereinafter, referred to as a "test score image") from each of the test score boxes 22, performs character recognition, and reports the result of collected test scores to each university.

A feature of a student identification code scheme is assumed to be at least one of the rules concerning student identification codes generated in accordance with the student identification code scheme. Examples of the at least one of the rules concerning student identification codes include, but are not limited to, rule number 1 in which a character at a predetermined position in a student identification code needs to be one of predetermined characters, rule number 2 in which a student identification code includes a predetermined number of characters, and rule number 3 in which a student identification code includes at least one of predetermined characters.

A case in which rule number 1 is adopted as the at least one of the rules concerning a student identification code will be described below as a first example, a case in which rule number 2 is adopted as the at least one of the rules concerning a student identification code will be described below as a second example, and two cases in which rule number 3 is adopted as the at least one of the rules concerning a student identification code will be described below as a third example and as a fourth example. Rule number 1 is an example of the first rule described above, rule number 2 is an example of the second rule described above, and rule number 3 is an example of the third rule described above.

First Example

Figure 5:
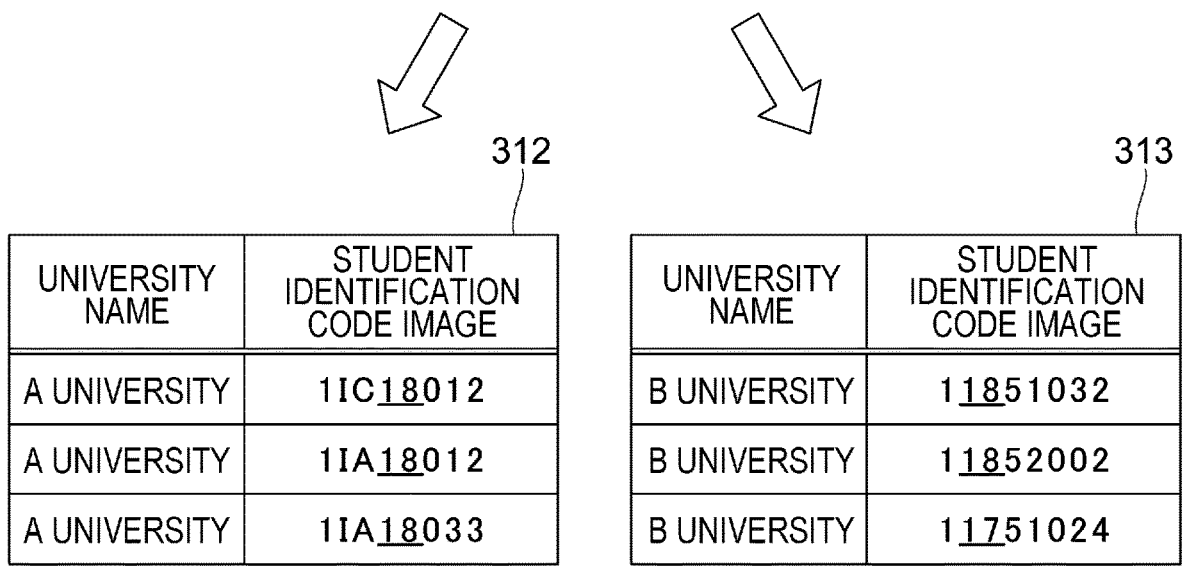
FIG. 5 is a schematic illustration depicting a first example of the teaching support apparatus according to the exemplary embodiment of the present disclosure.

FIG. 5 is a schematic illustration depicting the first example. In FIG. 5, the teaching support apparatus 30 acquires the student identification code images depicted in Table 311. Although the name of a university that corresponds to each student identification code image is not known at this time point, university names are also presented as supplementary information in Table 311.

In the first example, character positions for a specific item in a student identification code are used as a feature of a student identification code scheme. It is assumed that the specific item is an academic year of enrollment and that the academic year of enrollment is represented by the last two digits of a year in the Western calendar, specifically either "16" in "2016", "17" in "2017", or "18" in "2018". As indicated by using underlines, the character positions for the academic year of enrollment in a student identification code of A university are the fourth and fifth characters from the first, and the character positions for the academic year of enrollment in a student identification code of B university are the second and third characters from the first.

In this example, as indicated in Table 312, the teaching support apparatus 30 sorts student identification code images in which the fourth and fifth characters from the first are determined to be similar to either "16", "17", or "18" into the group corresponding to A university. In addition, as indicated in Table 313, the teaching support apparatus 30 sorts student identification code images in which the fourth and fifth characters from the first are determined to be dissimilar from any one of "16", "17", and "18" into the group corresponding to B university.

Then, the teaching support apparatus 30 performs character recognition on the student identification code images presented in Table 312 within the range specified in advance for A university. In addition, the teaching support apparatus 30 performs character recognition on the student identification code images presented in Table 313 within the range specified in advance for B university.

Subsequently, the teaching support apparatus 30 performs character recognition on test score images and reports a result of test scores collected for A university to A university and a result of test scores collected for B university to B university.

Second Example

FIG. 6 is a schematic illustration depicting the second example. In FIG. 6, the teaching support apparatus 30 acquires the student identification code images depicted in Table 321. Although the name of a university that corresponds to each student identification code image is not known at this time point, university names are also presented as supplementary information in Table 321.

In the second example, the number of characters in a student identification code is used as a feature of a student identification code scheme. As indicated by using a vertical dashed line and underlines, it is assumed that the number of characters in a student identification code of C university is nine and the number of characters in a student identification code of B university is eight.

In this example, as indicated in Table 322, the teaching support apparatus 30 sorts student identification code images determined to have nine characters into the group corresponding to C university. In addition, as indicated in Table 323, the teaching support apparatus 30 sorts student identification code images determined not to have nine characters into the group corresponding to B university.

Then, the teaching support apparatus 30 performs character recognition on the student identification code images presented in Table 322 within the range specified in advance for C university. In addition, the teaching support apparatus 30 performs character recognition on the student identification code images presented in Table 323 within the range specified in advance for B university.

Subsequently, the teaching support apparatus 30 performs character recognition on test score images and reports a result of test scores collected for C university to C university and a result of test scores collected for B university to B university.

Third Example

FIG. 7 is a schematic illustration depicting the third example. In FIG. 7, the teaching support apparatus 30 acquires the student identification code images depicted in Table 331. Although the name of a university that corresponds to each student identification code image is not known at this time point, university names are also presented as supplementary information in Table 331.

In the third example, inclusion of a specific kind of character in a student identification code is used as a feature of a student identification code scheme. Examples of a specific kind of character include a lower-case alphabetic letter, an upper-case alphabetic letter, and a numeral, and an upper-case alphabetic letter is chosen in this example. Although inclusion of a specific kind of character at any character position in a student identification code may be used as the feature, inclusion of a specific kind of character at a specific character position in a student identification code is used as the feature in this example. As indicated by using underlines, it is assumed that a student identification code of A university includes an upper-case alphabetic letter as the second character and as the third character and that a student identification code of B university does not include an upper-case alphabetic letter.

In this example, as indicated in Table 332, the teaching support apparatus 30 sorts student identification code images determined to include an upper-case alphabetic letter as the second character and as the third character into the group corresponding to A university. In addition, as indicated in Table 333, the teaching support apparatus 30 sorts student identification code images determined to include an upper-case alphabetic letter neither as the second character nor as the third character into the group corresponding to B university.

Then, the teaching support apparatus 30 performs character recognition on the student identification code images presented in Table 332 within the range specified in advance for A university. In addition, the teaching support apparatus 30 performs character recognition on the student identification code images presented in Table 333 within the range specified in advance for B university.

Subsequently, the teaching support apparatus 30 performs character recognition on test score images and reports a result of test scores collected for A university to A university and a result of test scores collected for B university to B university.

Fourth Example

FIG. 8 is a schematic illustration depicting the fourth example. In FIG. 8, the teaching support apparatus 30 acquires the student identification code images depicted in Table 341. Although the name of a university that corresponds to each student identification code image is not known at this time point, university names are also presented as supplementary information in Table 341.

In the fourth example, inclusion of a special character in a student identification code is used as a feature of a student identification code scheme. Examples of a special character include a hyphen (-) and an asterisk (*), and a hyphen (-) is chosen in this example. Although inclusion of a special character at any character position in a student identification code may be used as the feature, inclusion of a special character at a specific character position in a student identification code is used as the feature in this example. As indicated by using underlines, it is assumed that a student identification code of D university includes a hyphen (-) as the sixth character and that a student identification code of C university does not include a hyphen (-).

In this example, as indicated in Table 342, the teaching support apparatus 30 sorts student identification code images determined to include a hyphen (-) as the sixth character into the group corresponding to D university. In addition, as indicated in Table 343, the teaching support apparatus 30 sorts student identification code images determined not to include a hyphen (-) as the sixth character into the group corresponding to C university.

Then, the teaching support apparatus 30 performs character recognition on the student identification code images presented in Table 342 within the range specified in advance for D university. In addition, the teaching support apparatus 30 performs character recognition on the student identification code images presented in Table 343 within the range specified in advance for C university.

Subsequently, the teaching support apparatus 30 performs character recognition on test score images and reports a result of test scores collected for D university to D university and a result of test scores collected for C university to C university.

Functional Configuration of Teaching Support Apparatus

Figure 9:
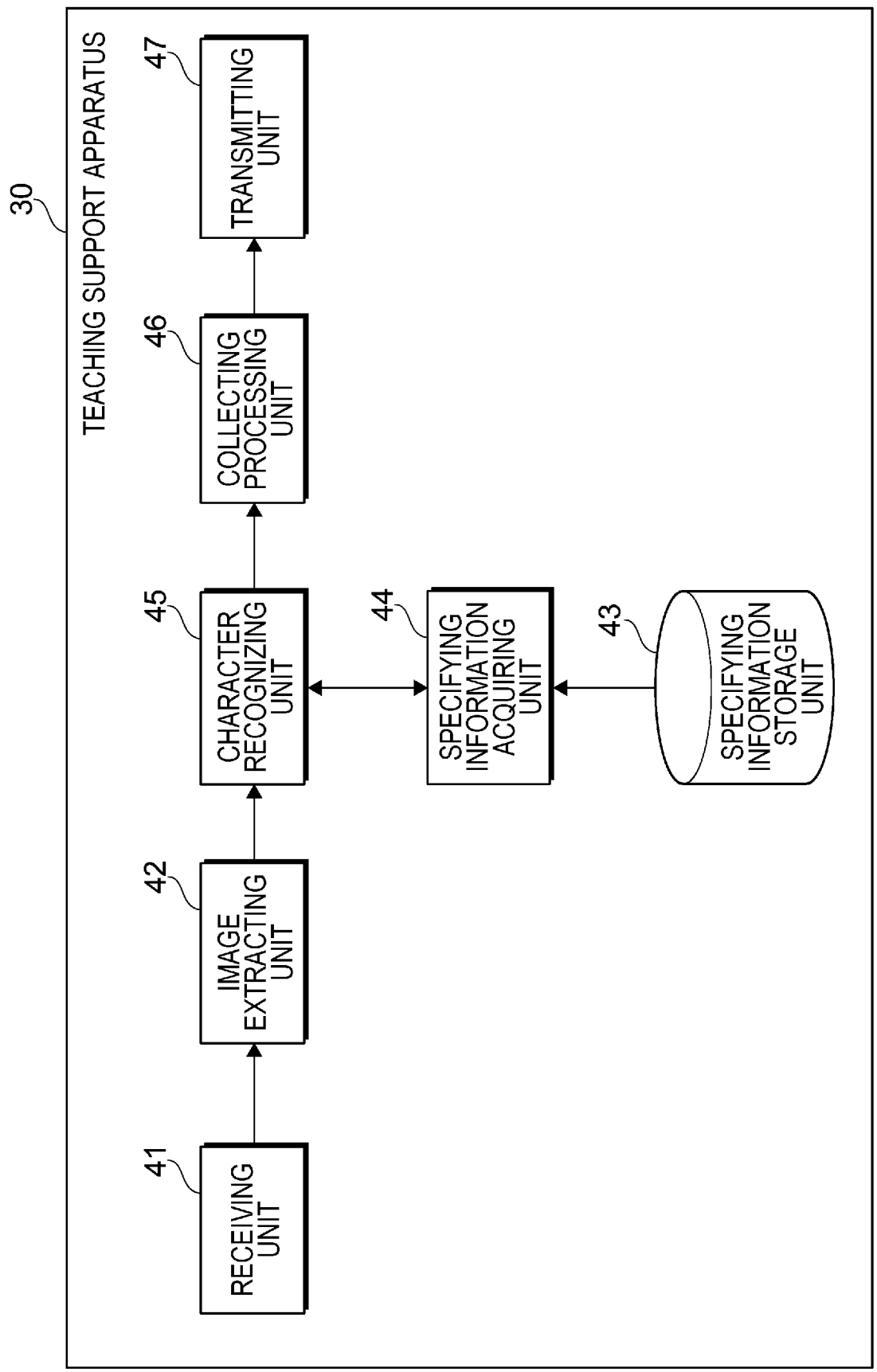
FIG. 9 is a block diagram depicting an example of a functional configuration of the teaching support apparatus according to the exemplary embodiment of the present disclosure.

FIG. 9 is a block diagram depicting an example of a functional configuration of the teaching support apparatus 30 according to the present exemplary embodiment. As depicted in FIG. 9, the teaching support apparatus 30 according to the present exemplary embodiment includes a receiving unit 41, an image extracting unit 42, a specifying information storage unit 43, a specifying information acquiring unit 44, a character recognizing unit 45, a collecting processing unit 46, and a transmitting unit 47.

The receiving unit 41 receives from the image reading apparatus 10 read images obtained by scanning the answer sheets 20 and outputs the read images to the image extracting unit 42.

The image extracting unit 42 identifies a region corresponding to the student identification code box 21 and a region corresponding to the test score box 22 on each of the read images received from the receiving unit 41. The information indicating the position of the region corresponding to the student identification code box 21 and the position of the region corresponding to the test score box 22 is desirably encoded and printed, for example, at a predetermined position on each of the answer sheets 20. The image extracting unit 42 extracts a student identification code image and a test score image, respectively, from the region corresponding to the student identification code box 21 and the region corresponding to the test score box 22 that have been identified. Then, the image extracting unit 42 outputs the student identification code image and the test score image to the character recognizing unit 45 along with the read image. In the present exemplary embodiment, a student identification code image is used as an example of a string image, and the image extracting unit 42 is disposed as an example of an acquiring unit that acquires a string image.

The specifying information storage unit 43 stores specifying information for each university, and the specifying information includes item information and range information. The item information indicates an item to which a character at each character position in a student identification code is assigned, and the range information indicates the range of characters at each character position in a student identification code. It can be said that the specifying information includes pieces of feature information such as the range of characters at each character position in a student identification code, the number of characters in a student identification code, the type of character at each character position in a student identification code, and the type of special character at a character position for a special character in a student identification code that includes at least one special character. A specific example of the specifying information will be described below.

Upon receiving from the character recognizing unit 45 information that a student identification code image and a test score image have been received, the specifying information acquiring unit 44 outputs to the character recognizing unit 45 at least one character position at which the first character recognition is to be performed in the student identification code image and feature information stored in the specifying information storage unit 43. In the first example, the at least one character position is a character position assigned to a specific item, and the feature information is specification of the range of characters at the character position. In the second example, the at least one character position is a character position at which the number of characters in a student identification code can be determined, and the feature information is whether a character is present at the character position. In the third example, the at least one character position is a character position at which a specific kind of character can be present, and the feature information is the type of the specific kind of character. In the fourth example, the at least one character position is a character position at which a special character can be present, and the feature information is the type of the special character.

Subsequently, the specifying information acquiring unit 44 acquires from the character recognizing unit 45 the matching degree between the image at the at least one specified character position in a student identification code image and the specified feature information. In the first example, the matching degree is the degree of similarity between the result of character recognition of the image at the at least one specified character position in a student identification code image and a character within the specified range. If a plurality of characters are present within the specified range, the degree of similarity to the most similar character is desirably adopted. If the at least one specified character position includes a plurality of character positions adjacent to each other, the degree of similarity calculated in some way by using the degree of similarity at each character position is desirably adopted. In the second example, the matching degree is the credibility of the conclusion that an image of a character is present at a specified character position in a student identification code image. For example, if a student identification code having nine characters is distinguished from a student identification code having eight characters, the matching degree is the probability that a student identification code image has a ninth character. In the third example, the matching degree is the degree of similarity between the result of character recognition of the image at the at least one specified character position in a student identification code image and a character of a specified kind. In the fourth example, the matching degree is the degree of similarity between the result of character recognition of the image at the at least one specified character position in a student identification code image and a special character of the specified kind.

The specifying information acquiring unit 44 identifies a university corresponding to a student identification code image in accordance with whether the matching degree obtained from the character recognizing unit 45 is equal to or higher than a predetermined threshold. Then, the specifying information acquiring unit 44 outputs the university name to the character recognizing unit 45. It is assumed in this example that the university name is output, but any information may be output as long as the information identifies the university. The specifying information acquiring unit 44 outputs to the character recognizing unit 45 the range information specified for the university as the information indicating the range of characters to be used in the second character recognition. In the present exemplary embodiment, a range indicated by range information is used as an example of a range specified for a result of character recognition, and the specifying information acquiring unit 44 is disposed as an example of an identifying unit that identifies a range specified for a result of character recognition.

Upon receiving from the image extracting unit 42 a student identification code image and a test score image, the character recognizing unit 45 reports to the specifying information acquiring unit 44 that a student identification code image and a test score image have been received. Subsequently, upon receiving from the specifying information acquiring unit 44 at least one character position and feature information, the character recognizing unit 45 performs the first character recognition, in which an image of at least one character at the at least one character position in the student identification code image is recognized, and calculates the matching degree between the result of the first character recognition and the received feature information. Then the character recognizing unit 45 outputs the matching degree to the specifying information acquiring unit 44. In the present exemplary embodiment, the character recognizing unit 45 is disposed as an example of a character recognizing unit that performs the first character recognition of a string image.

Then, upon receiving a university name from the specifying information acquiring unit 44, the character recognizing unit 45 attaches the university name to the read image received from the image extracting unit 42. In other words, the read images are sorted by university. Upon receiving range information from the specifying information acquiring unit 44, the character recognizing unit 45 performs the second character recognition in which the student identification code image received from the image extracting unit 42 is recognized within the range indicated by the range information. In the present exemplary embodiment, the character recognizing unit 45 is disposed as an example of a character recognizing unit that performs the second character recognition of a string image within the range specified for a result of character recognition in a particular string generation scheme.

Further, the character recognizing unit 45 performs character recognition on the test score images received from the image extracting unit 42 and acquires a test score for each student identification code. Then, for each university, the character recognizing unit 45 outputs to the collecting processing unit 46 the test score and the read image for each student identification code that belongs to the university.

Upon receiving from the character recognizing unit 45 the test score and the read image for each student identification code that belongs to each university, the collecting processing unit 46 collects test scores for each university. Then, the collecting processing unit 46 outputs a result of collected test scores and the read images for each university to the transmitting unit 47.

For each university, the transmitting unit 47 transmits the result of collected test scores and the read images to the teaching management server 50 of the university.

FIG. 10 is an illustration depicting a specific example of specifying information stored in the specifying information storage unit 43. As depicted in FIG. 10, for each university, the specifying information specifies information concerning the student identification code scheme of the university with respect to the university name.

A student identification code is typically obtained by encoding information such as an academic year of enrollment, a student type, a department type, and a personal identification number. Accordingly, the information concerning the student identification code scheme includes item information indicating items such as an academic year of enrollment, a student type, a department type, and a personal identification number, and for each character position in a student identification code, a character at the character position is assigned to one of the items.

An academic year of enrollment can be represented by the last two digits of a year in the Western calendar as in the case of A university, B university, and D university. Alternatively, an academic year of enrollment can be represented by an alphabetic letter representing the era in the Japanese calendar and two digits representing a year in the era as in the case of C university. A student type is a code representing undergraduate, graduate, or the like and can be represented by a numeral as in the case of A university and B university or by an alphabetic letter as in the case of C university and D university. A department type is a code representing Department of X, Y Course, and the like and can be represented by numerals as in the case of B university and D university or by alphabetic letters as in the case of A university and C university. A personal identification number can be represented by a serial number assigned to each person. Accordingly, the information concerning the student identification code scheme includes range information that indicates the range of characters at each character position in a student identification code.

It can be said that in the first example, the specifying information in FIG. 10 includes as the feature information the range of characters at a character position assigned to a specific item. It can be said that in the second example, the specifying information in FIG. 10 includes as the feature information presence of a character at a character position at which the number of characters in a student identification code can be determined. It can be said that in the third example, the specifying information in FIG. 10 includes as the feature information the type of a specific kind of character at a character position at which the specific kind of character can be present. It can be said that in the fourth example, the specifying information in FIG. 10 includes as the feature information the type of a special character at a character position at which the special character can be present.

In this example, the university name, the item information, and the range information are associated with each other in a single table, but a table for associating the university name with the item information and a table for associating the university name with the range information may separately be prepared. Further, the university name is used as the information to identify a university, but the information such as a code representing a university may be used.

Operation of Teaching Support Apparatus

Figure 11:
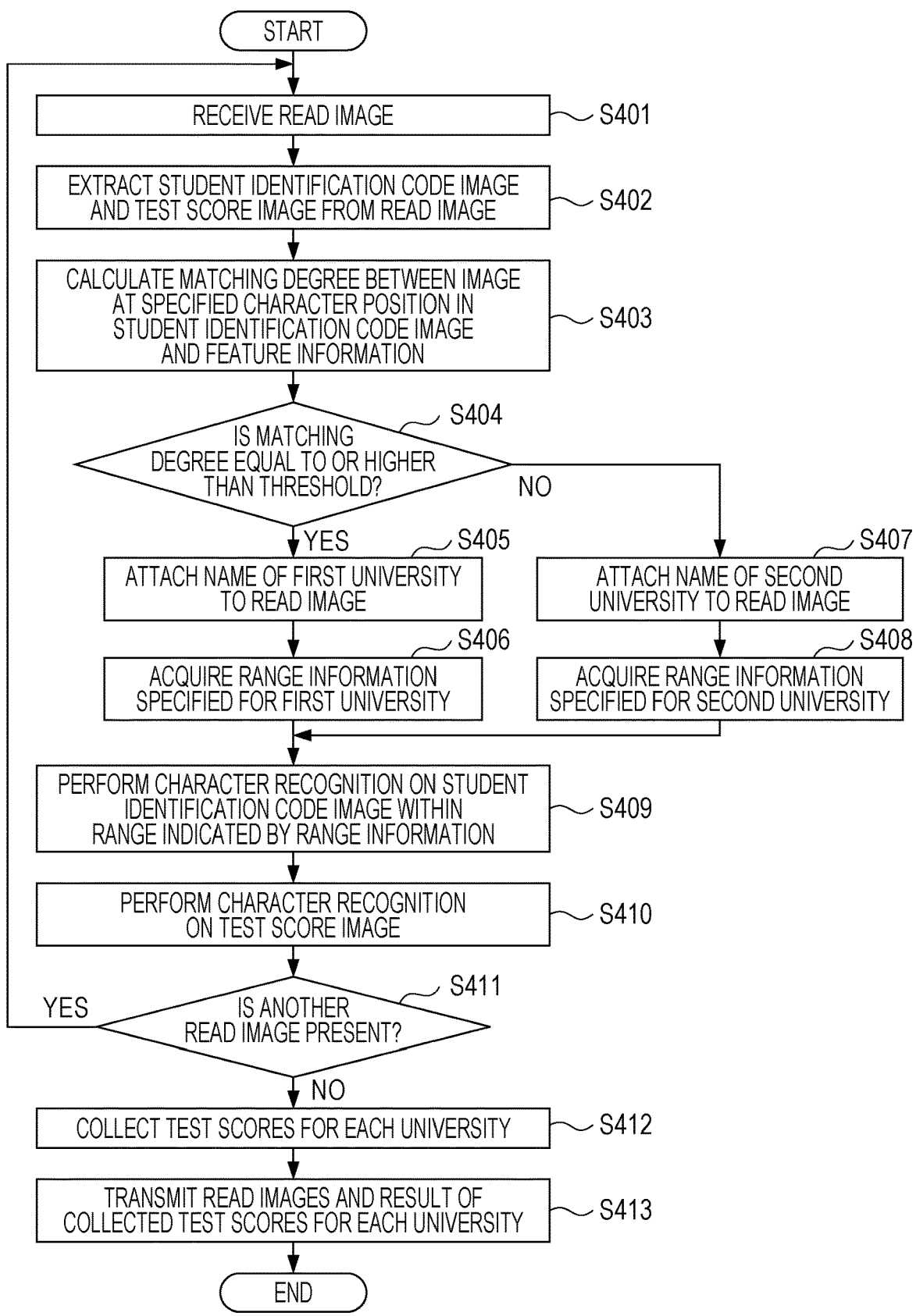
FIG. 11 is a flowchart depicting an example operation of the teaching support apparatus according to the exemplary embodiment of the present disclosure.

FIG. 11 is a flowchart depicting an example operation of the teaching support apparatus 30 according to the present exemplary embodiment. In FIG. 10, the specifying information for four universities is presented, but in this example operation, student identification codes that each belong to either of two universities (referred to as the "first university" and the "second university") are sorted by university. It is assumed that the specifying information acquiring unit 44 acquires from the specifying information storage unit 43 feature information representing a feature of student identification codes of the first university and provides the character recognizing unit 45 with the feature information before the example operation begins. For example, in the first example, it is assumed that the first university is A university and that the feature information is the information that the fourth character from the first is "1" and the fifth character from the first is either "6", "7", or "8". In the second example, it is assumed that the first university is C university and that the feature information is the information that the ninth character from the first is present. In the third example, it is assumed that the first university is A university and that the feature information is the information that the second character and the third character from the first are alphabetic letters. In the fourth example, it is assumed that the first university is D university and that the feature information is the information that the sixth character from the first is a hyphen (-).

Under this condition, first, the receiving unit 41 receives a read image from the image reading apparatus 10 (step S401).

Next, the image extracting unit 42 extracts a student identification code image and a test score image from the read image received in step S401 (step S402).

Subsequently, the character recognizing unit 45 calculates the matching degree between an image in the student identification code image extracted in step S402, the image being located at the character position specified in advance by the specifying information acquiring unit 44, and the feature information specified in advance by the specifying information acquiring unit 44 (step S403). For example, in the first example, the matching degree is the degree of similarity between the images of the fourth character and the fifth character from the first and one of "16", "17", and "18", whichever is the most similar. The degree of similarity may be obtained by calculation by using the degree of similarity between the image of the fourth character from the first and "1" and the degree of similarity between the image of the fifth character from the first and one of "6", "7", and "8", whichever is the most similar. In the second example, the matching degree is the credibility of the conclusion that an image of a character is present at the ninth character position from the first. In the third example, the matching degree is the degree of similarity between the images of the second character and the third character from the first and alphabetic letters. The degree of similarity may be obtained by calculation by using the degree of similarity between the image of the second character from the first and the most similar letter of all the alphabetic letters and the degree of similarity between the image of the third character from the first and the most similar letter of all the alphabetic letters. In the fourth example, the matching degree is the degree of similarity between the image of the sixth character from the first and a hyphen (-).

Then, the specifying information acquiring unit 44 determines whether the matching degree calculated in step S403 is equal to or higher than a predetermined threshold (step S404).

If it is determined in step S404 that the matching degree is equal to or higher than the threshold, the specifying information acquiring unit 44 attaches the name of the first university to the read image received in step S401 (step S405). In this example, the university name is attached, but any information may be attached as long as the information is used for identifying the university. Then, the specifying information acquiring unit 44 acquires from the specifying information storage unit 43 the range information specified for the first university (step S406).

In contrast, if it is determined in step S404 that the matching degree is less than the threshold, the specifying information acquiring unit 44 attaches the name of the second university to the read image received in step S401 (step S407). In this example, the university name is attached, but any information may be attached as long as the information is used for identifying the university. Then, the specifying information acquiring unit 44 acquires from the specifying information storage unit 43 the range information specified for the second university (step S408).

Then, the character recognizing unit 45 performs character recognition on the student identification code image extracted in step S402 within the range indicated by the range information acquired in step S406 or step S408 (step S409).

The character recognizing unit 45 also performs character recognition on the test score image extracted in step S402 (step S410).

Subsequently, the character recognizing unit 45 determines whether another read image obtained by scanning by using the image reading apparatus 10 is present (step S411). For example, it is desirable that when the answer sheets 20 of all the students have been scanned by using the image reading apparatus 10, the information that the answer sheets 20 of all the students have been scanned by using the image reading apparatus 10 be transmitted to the character recognizing unit 45 via the receiving unit 41 and the image extracting unit 42 and that the character recognizing unit 45 determine whether another read image is present in accordance with this information.

If it is determined in step S411 that another read image is present, the process returns to step S401. If it is not determined in step S411 that another read image is present, the collecting processing unit 46 uses the university name attached in step S405 or step S407 and collects test scores obtained by the character recognition in step S410 for each university (step S412).

Then, for each university, the collecting processing unit 46 uses the university name attached in step S405 or step S407 and transmits to the teaching management server 50 of the university the read images received in step S401 and the result of collected test scores obtained in step S412 (step S413).

In this example operation, the student identification codes that each belong to one of the two universities are sorted, but this is not meant to be limiting. In general, student identification codes that each belong to one of a plurality of universities sometimes need to be sorted. In such a case, this example operation, which is an example operation for selecting student identification codes of one university from student identification codes of a plurality of universities, is desirably repeated a plurality of times.

For example, if the specifying information for A university to D university depicted in FIG. 10 is stored, the following operation is desirably performed. First, performing the operation in the third example selects the student identification codes of A university from the student identification codes of A university to D university. Next, performing the operation in the second example selects the student identification codes of B university from the remaining student identification codes of B university to D university. Finally, performing the operation in the fourth example sorts the remaining student identification codes of C university and D university into the student identification codes of C university and the student identification codes of D university.

In the above examples, the case in which the present exemplary embodiment is applied to character recognition of student identification codes has been described, but the present exemplary embodiment may be applied to character recognition of other strings generated in accordance with a plurality of string generation schemes. Examples of character recognition of this kind include character recognition for sorting serial numbers by manufacturer in the case where serial number schemes for products manufactured by a plurality of manufacturers differ from manufacturer to manufacturer.

Non-Transitory Computer Readable Medium

Processing performed by the teaching support apparatus 30 according to the present exemplary embodiment is, for example, provided as a non-transitory computer readable medium storing a program such as application software.

Thus, a non-transitory computer readable medium according to the present exemplary embodiment stores a program causing a computer to execute a process including a function of acquiring a string image that is an image of a string generated in accordance with one of a plurality of string generation schemes, a function of identifying a range specified for a result of character recognition in each of the plurality of string generation schemes, and a function of performing the first character recognition on the string image and if a result of the first character recognition has a feature of a particular string generation scheme of the plurality of string generation schemes, performing the second character recognition on the string image within the range specified for a result of character recognition in the particular string generation scheme.

The programs for realizing the present exemplary embodiment may be provided by transmission via a communication unit or in a stored form in a recording medium, such as a compact-disc ROM (CD-ROM).

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A character recognizing apparatus comprising:
a processor programmed to:
acquire a string image that is an image of a string of characters generated in accordance with one of a plurality of string generation schemes;
perform first character recognition on the string image to determine whether the string satisfies one of predetermined rules including:
(i) a character at a predetermined position in the string is one of predetermined characters, and
(ii) the string includes a predetermined number of characters;
based on a determination whether the string satisfies one of the predetermined rules (i) and (ii), identify a particular string generation scheme that is used to generate the string among the plurality of string generation schemes, and specify a partial range within the string for second character recognition; and
perform the second character recognition on the partial range specified within the string.

2. The character recognizing apparatus according to claim 1,
wherein for each of the plurality of string generation schemes, a feature of a respective string generation scheme and a range specified for second character recognition in the respective string generation scheme are associated with an attribute of an object represented by a string generated in accordance with the respective string generation scheme, and
if a result of the first character recognition indicates a feature of the particular string generation scheme, the processor identifies an attribute with which the feature of the particular string generation scheme is associated and specifies the partial range for second character recognition based on the attribute.

3. The character recognizing apparatus according to claim 2,
wherein the attribute is a category to which an object represented by a string generated in accordance with one of the plurality of string generation schemes belongs.

4. The character recognizing apparatus according to claim 2,
wherein the feature of the particular string generation scheme is a rule concerning a string generated in accordance with the particular string generation scheme.

5. The character recognizing apparatus according to claim 4,
wherein the rule concerning a string is a rule in which a character at a predetermined position in the string is one of predetermined characters.

6. The character recognizing apparatus according to claim 4,
wherein the rule concerning a string is a rule in which the string includes a predetermined number of characters.

7. The character recognizing apparatus according to claim 4,
wherein the rule concerning a string is a rule in which the string includes at least one of predetermined characters or a rule in which the string includes none of the predetermined characters.

8. A non-transitory computer readable medium storing a program causing a computer to execute a process for character recognition, the process comprising:
acquiring a string image that is an image of a string of characters generated in accordance with one of a plurality of string generation schemes;
performing first character recognition on the string image to determine whether the string satisfies one of predetermined rules including:
(i) a character at a predetermined position in the string is one of predetermined characters, and
(ii) the string includes a predetermined number of characters;
based on a determination whether the string satisfies one of the predetermined rules (i) and (ii), identifying a particular string generation scheme that is used to generate the string among the plurality of string generation schemes, and specifying a partial range within the string for second character recognition; and
performing the second character recognition on the partial range within the string.

9. A method for character recognition comprising:
acquiring a string image that is an image of a string of characters generated in accordance with one of a plurality of string generation schemes;
performing first character recognition on the string image to determine whether the string satisfies one of predetermined rules including:
(i) a character at a predetermined position in the string is one of predetermined characters, and
(ii) the string includes a predetermined number of characters;
based on a determination whether the string satisfies one of the predetermined rules (i) and (ii), identifying a particular string generation scheme that is used to generate the string among the plurality of string generation schemes, and specifying a partial range within the string for second character recognition; and
performing the second character recognition on the partial range within the string.

10. The character recognizing apparatus according to claim 1,
wherein each of the plurality of string generation schemes has a corresponding preset target partial range for second character recognition, and the partial range specified is the preset target partial range for the particular string generation scheme.

11. The character recognizing apparatus according to claim 1, wherein the predetermined rules further include: (iii) the string includes at least one of preset special characters, and (iv) the string includes none of the preset special characters; and the processor identifies the particular string generation scheme based on a determination whether the string satisfies one of the predetermined rules (i), (ii), (iii), and (iv).

* * * * *